United States Patent
Meißer et al.

(10) Patent No.: US 12,162,003 B2
(45) Date of Patent: Dec. 10, 2024

(54) REFORMER DOUBLE BOTTOM

(71) Applicants: thyssenkrupp Industrial Solutions AG, Essen (DE); thyssenkrupp AG, Essen (DE)

(72) Inventors: Oliver Meißer, Gladbeck (DE); Marco Scholz, Dortmund (DE)

(73) Assignees: thyssenkrupp Uhde GmbH, Dortmund (DE); thyssenkrupp AG, Essen (DE)

( * ) Notice: Subject to any disclaimer, the term of this patent is extended or adjusted under 35 U.S.C. 154(b) by 621 days.

(21) Appl. No.: 17/599,462

(22) PCT Filed: Mar. 18, 2020

(86) PCT No.: PCT/EP2020/057365
§ 371 (c)(1),
(2) Date: Sep. 28, 2021

(87) PCT Pub. No.: WO2020/200778
PCT Pub. Date: Oct. 8, 2020

(65) Prior Publication Data
US 2022/0193627 A1 Jun. 23, 2022

(30) Foreign Application Priority Data
Apr. 4, 2019 (DE) ...................... 10 2019 204 814.5

(51) Int. Cl.
*B01J 8/06* (2006.01)
*B01J 8/02* (2006.01)
*C01B 3/38* (2006.01)

(52) U.S. Cl.
CPC ............. *B01J 8/062* (2013.01); *B01J 8/0242* (2013.01); *B01J 8/067* (2013.01); *C01B 3/384* (2013.01);
(Continued)

(58) Field of Classification Search
CPC ..... B01J 8/00; B01J 8/02; B01J 8/0242; B01J 8/06; B01J 8/062; B01J 8/067;
(Continued)

(56) References Cited

U.S. PATENT DOCUMENTS

| 4,193,776 A | 3/1980 | Wasala et al. |
| 4,695,442 A | 9/1987 | Pinto et al. |

(Continued)

FOREIGN PATENT DOCUMENTS

| CA | 2859090 A1 * | 6/2013 | ............. B01J 8/062 |
| DE | 2 061 455 A1 | 6/1972 | |

(Continued)

OTHER PUBLICATIONS

Ullmann's Encyclopedia of Industrial Chemistry, Ammonia, 2. Production Processes, Wiley-VCH Verlag GmbH &Co. KGaA, Weinheim, vol. 3, pp. 139-225, DOI:10.1002/14356007.o02_o11 (2012).

(Continued)

*Primary Examiner* — Natasha E Young
(74) *Attorney, Agent, or Firm* — thyssenkrupp North America, LLC (57) ABSTRACT

A reformer for production of synthesis gas may include a reformer firing space having a reformer base, reformer walls, and a reformer roof. The reformer may include a first reformer tube and a second reformer tube, with at least sections of the first reformer tube and the second reformer tube being arranged within the reformer firing space. At least one reformer burner is disposed outside the reformer firing space. A cooling duct on or beneath the reformer base is disposed between the first reformer tube and the second reformer tube. The first reformer tube and the second reformer tube can be connected to a collecting system (Continued)

outside the reformer firing space, with the collecting system being disposed beneath the reformer base.

19 Claims, 4 Drawing Sheets

(52) U.S. Cl.
CPC ............... *B01J 2208/00168* (2013.01); *B01J 2208/00495* (2013.01); *B01J 2208/00504* (2013.01); *C01B 2203/0233* (2013.01); *C01B 2203/061* (2013.01); *C01B 2203/068* (2013.01); *C01B 2203/0816* (2013.01); *C01B 2203/0883* (2013.01); *C01B 2203/1058* (2013.01); *C01B 2203/1614* (2013.01)

(58) Field of Classification Search
CPC .......... B01J 2208/00; B01J 2208/00008; B01J 2208/00017; B01J 2208/00168; B01J 2208/00477; B01J 2208/00495; B01J 2208/00504; C01B 3/00; C01B 3/02; C01B 3/32; C01B 3/34; C01B 3/38; C01B 3/384; C01B 2203/00; C01B 2203/02; C01B 2203/0205; C01B 2203/0227; C01B 2203/0233; C01B 2203/06; C01B 2203/061; C01B 2203/068; C01B 2203/08; C01B 2203/0805; C01B 2203/0811; C01B 2203/0816; C01B 2203/0871; C01B 2203/088; C01B 2203/10; C01B 2203/1041; C01B 2203/1047; C01B 2203/1052; C01B 2203/1058; C01B 2203/16; C01B 2203/1614; Y02P 20/00; Y02P 20/50; Y02P 20/52
See application file for complete search history.

(56) References Cited

U.S. PATENT DOCUMENTS

| | | |
|---|---|---|
| 2005/0107480 A1 | 5/2005 | Davey et al. |
| 2010/0044641 A1 | 2/2010 | Mateos Queiruga et al. |
| 2014/0314631 A1 | 10/2014 | Meissner et al. |

FOREIGN PATENT DOCUMENTS

| | | | |
|---|---|---|---|
| DE | 102 26 209 A1 | 1/2004 | |
| DE | 102004013539 A1 | 10/2005 | |
| DE | 10 2004 059 014 A1 | 6/2006 | |
| DE | 10 2009 030 480 B3 | 8/2010 | |
| DE | 102011120938 A1 | 6/2013 | |
| EP | 3 138 810 A1 | 4/1983 | |
| EP | 1 094 031 A1 | 4/2001 | |
| JP | H 02-129002 A | 5/1990 | |
| WO | 2008/149516 A1 | 8/2010 | |
| WO | 2010/120962 A1 | 10/2010 | |
| WO | 2010149361 A2 | 12/2010 | |
| WO | 2017/058744 A2 | 4/2017 | |
| WO | WO-2017134225 A1 * | 8/2017 | ............. B01J 8/062 |

OTHER PUBLICATIONS

Holleman, Wiberg, Lehrbuch der Anorganischen Chemie, Textbook of Inorganic Chemistry, 102nd edition, pp. 662-665 (ISBN 978-3-11-017770-1) (2007).
Andreas Jess, Peter Wasserscheid, Chemical Technology, An Integral Textbook, Wiley-VCH, pp. 536 to 539, ISBN 978-3-527-30446-2) (2013).
Andreas Jess, Peter Wasserscheid, Chemical Technology, An Integral Textbook, Wiley-VCH, pp. 686 to 694, ISBN 978-3-527-30446-2 (2013).
Saade, G.A., CEH Marketing Research Report METHANOL, the Chemical Economics Handbook-SRI Consulting, 108 pages (Jul. 2009).
English Translation of International Search Report issued in PCT/EP2020/057365, dated May 20, 2020.

* cited by examiner

REFORMER DOUBLE BOTTOM

CROSS REFERENCE TO RELATED APPLICATIONS

This application is a U.S. National Stage Entry of International Patent Application Serial Number PCT/EP2020/057365, now WO 2020/200778, filed Mar. 18, 2020, which claims priority to German Patent Application No. DE 10 2019 204 814.5, filed Apr. 4, 2019, the entire contents of both of which are incorporated herein by reference.

FIELD

The present disclosure generally relates to reformers for producing synthesis gas for dehydrogenation of propane and butane, to processes for producing synthesis gas, and to plants that include such reformers for preparing ammonia, ammonia and urea, dehydrogenation of propane and butane, hydrogen and methanol.

BACKGROUND

The production of hydrogen, especially for preparation of ammonia and methanol, is an important base process in the chemical industry.

Ammonia is the second most produced synthetic chemical globally (Ullmann's Encyclopedia of Industrial Chemistry, 2012, Wiley-VCH Verlag GmbH &Co. KGaA, Weinheim, DOI:10.1002/14356007.o02_o11, "Ullmann's" hereinafter).

Ammonia is prepared essentially from the elements hydrogen and nitrogen in the presence of an iron catalyst. The temperatures frequently vary within the range between 400° C. and 500° C. and at a pressure exceeding 100 bar. The main factor for the process costs lies in the provision of hydrogen from the synthesis gas preparation (Ullmann's, page 139).

Production of ammonia is accordingly preferably effected in principle as described, for example, in Holleman, Wiberg, Lehrbuch der Anorganischen Chemie [Inorganic Chemistry], 102nd edition, 2007, pages 662-665 (ISBN 978-3-11-017770-1), based on the "Haber-Bosch process", from the elements according to equation [1]:

$$3H_2 + N_2 \rightleftharpoons 2NH_3 + 92.28 \text{ kJ} \quad [1]$$

The nitrogen reactant ($N_2$) can be obtained, for example, by cryogenic air fractionation. Hydrogen is preferably obtained by the steam reforming process (for example as in Andreas Jess, Peter Wasserscheid, Chemical Technology, An Integrated Textbook, Wiley-VCH, 2013, pages 536 to 539, ISBN 978-3-527-30446-2) according to equation [2]:

$$C_nH_{2m} + nH_2O \rightleftharpoons (n+m)H_2 + nCO \quad [2]$$

In the subsequent "carbon dioxide conversion", a further conversion is effected according to equation (3):

$$CO + H_2O \rightleftharpoons CO_2 + H_2 \quad [3]$$

Methanol with an annual production in 2007 of $52.1 \times 10^6$ t (Saade, G. A. (2009) Chemical Economics Handbook-SRI Consulting) is also an important commodity chemical. As described in "Andreas Jess, Peter Wasserscheid, Chemical Technology, An Integrated Textbook, Wiley-VCH, 2013, pages 686 to 694, ISBN 978-3-527-30446-2", the reaction can be described in simplified terms by equations [4] and [5]:

$$CO + 2H_2 \rightleftharpoons CH_3OH \quad [4]$$

$$CO_2 + 3H_2 \rightleftharpoons CH_3OH + H_2O \quad [5]$$

Suitable reaction conditions and catalysts for methanol synthesis can likewise be found in the above literature reference.

In a further application, the reformer may be used for dehydrogenation (elimination of hydrogen) from propane or butane to give propene and butene respectively.

In the primary reformer, in the endothermic reforming reaction, hydrocarbons, for example methane, are cracked with the aid of steam to give hydrogen and carbon monoxide (and partly $CO_2$). It is customary in the art for the necessary energy for heating of the gas/steam mixture and of the catalyst to the effected by means of the reformer burners. The reformer burners, through the combustion of an air/natural gas mixture, for example, transfer the heat to the outer reformer tube walls by means of thermal radiation and convection. Through convection and thermal conduction, the heat flows onward into the gas/steam mixture and the catalyst, which provides the energy for the reforming reaction. The temperatures that occur in the firing space of the primary reformer are frequently in the region of about 1000° C. Great demands are naturally made here on all components installed in the reformer. Particularly the expansion of material, which is different depending on the temperature, may be the cause of occurrence of material fatigue and damage.

The reformer base is affected thereby to a particular degree. The reformer base is frequently manufactured from metal plates that are lined with a refractory insulation layer for protection against the combustion temperatures that exist in the reformer interior. In order to assure access beneath the reformer and to reduce material stress and material fatigue in the reformer baseplate, and in order to minimize heat losses, the baseplate must not become too hot. At the same time, the refractory insulation layer cannot be as large or thick as desired for reasons of weight, space and cost.

DE 102 26 209 A1 discloses a plant for simultaneous preparation of methanol synthesis gas, ammonia synthesis gas, CO and $CO_2$ from natural gas.

Further processes for preparing ammonia are disclosed, for example, in U.S. Pat. No. 4,695,442 A, DE 10 2004 013 539 A1 and U.S. Pat. No. 4,193,776 A.

EP 3 138 810 A1 discloses a process for production of hydrogen in cold climatic zones.

DE 2 061 455 A discloses an apparatus for reforming hydrocarbons under pressure. What are disclosed are a heat exchange chamber and shaft chamber that are separated by a double intermediate base.

EP 1 094 031 A1 discloses a cylindrical single-tube reformer. The reformer comprises a heat recovery layer disposed around a catalyst layer.

WO 2017/058744 A2 discloses an arrangement of flue gas tunnels in a reformer system.

Thus a need exists to provide a reformer that does not have the disadvantages of the prior art described at the outset. The reformer needs a construction that distinctly reduces the temperature in the region of the baseplate and at the same time entails a minimum level of changes to the refractory insulation layer.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention further encompasses a plant for preparation of ammonia, ammonia and urea, hydrogen and methanol, comprising the reformer of the invention.

In a further configuration, the invention encompasses the use of the reformer of the invention for production of a gas mixture at least comprising hydrogen and carbon monoxide.

The invention additionally encompasses a process for preparing synthesis gas. Advantageous configurations are apparent from the dependent claims.

The reformer of the invention for preparation of synthesis gas or hydrogen and/or dehydrogenation of propane or butane comprises at least the components that follow. The expression "and/or dehydrogenation of propane or butane" in the context of the invention also encompasses isomers and mixtures of propane and butane. In the context of the invention, the expression "synthesis gas" encompasses a mixture of steam-reformed hydrocarbons and excess steam. A reformer firing space comprises a reformer base, reformer walls and a reformer roof. At least sections of a first reformer tube and a second reformer tube are disposed in the reformer firing space. The expression "at least sections of" in the context of the invention means that at least some of the first reformer tube and at least some of the second reformer tube run within the reformer firing space. In general, only a subsection of the first reformer tube and of the second reformer tube passes through the combustion chamber, meaning that the first reformer tube and the second reformer tube are guided into the combustion chamber and then guided out of the combustion chamber. The expression "first reformer tube and second reformer tube" in the context of the invention describes the requisite minimum configuration; there are generally further reformer tubes, for example 30 to 1800 reformer tubes, disposed in the reformer firing space. The reformer tubes are filled with a catalyst or catalyst bed, preferably nickel and/or compounds and/or mixtures with other compounds thereof. In addition, at least one reformer burner is present disposed within the reformer firing space. In general, multiple reformer burners are disposed in the reformer firing space, for example 15 to 600 reformer burners. The expression "reformer burner disposed within the reformer firing space" in the context of the invention encompasses all burners that are connected within the reformer firing space or together with the reformer firing space, wherein the combustion gases for the burners are guided into the reformer firing space. The reformer of the invention for production of synthesis gas is characterized in that a cooling duct is disposed in the reformer base or beneath the reformer base between the first reformer tube and the second reformer tube. The cooling duct in the context of the invention may be installed either above or below the reformer base. Reformer base in the context of the invention preferably comprises a sheet reinforced by the mounts that provide structural support. The expression "cooling duct" in the context of the invention encompasses tubes, passages, ducts that are disposed in or beneath the reform base and are suitable for passage of a suitable liquid or gaseous cooling medium through the reformer base. The cooling ducts are designed such that the cooling medium can absorb thermal energy from the reformer base, meaning that the cooling medium can heat up. The walls of the cooling ducts may comprise, inter alia, masonry elements (for example bricks), metal plates or ceramic wall elements. The conduction of a cooling medium, for example air, enables a distinct reduction in the temperature of the reformer base and hence an expected distinct increase in the lifetime of the reformer base, and also a noticeable reduction in the radiation of heat to persons or equipment beneath the reformer base.

The first reformer tube and the second reformer tube, and also generally further reformer tubes, are preferably connected to a collecting system outside the reformer firing space. More preferably, the collecting system is disposed beneath the reformer base.

Further preferably, the first collecting system is disposed in an underbody chamber beneath the reformer chamber. The underbody chamber is preferably accessible.

In a preferred embodiment, the reformer base comprises metallic, mineral or ceramic materials, more preferably metallic plates. In the operation of the reformer, these metallic plates are preferably at a temperature below 100° C. in order to minimize thermal expansion.

A refractory insulation layer is preferably disposed on the reformer base and cooling duct. The overall refractory insulation layer preferably consists of (or comprises) multiple layers of different ceramic materials having different thermal stabilities, insulation properties and resistance to mechanical material removal. These are, for example, dense or porous bricks, lightweight refractory concretes, insulation panels and/or components based on ceramic fibers.

In a further preferred embodiment, a second cooling duct is disposed in the reformer walls and/or the reformer roof. The inclusion of the second cooling duct(s) enables a reduction in temperature in otherwise thermally highly stressed regions of the reformer.

A flue gas ventilation duct is preferably disposed between the first reformer tube and the second reformer tube. The flue gas ventilation duct is preferably designed in the form of a brickbuilt duct, the duct having openings (flue gas inlet openings) to accommodate the combustion gas from the reformer firing space. More preferably, the flue gas ventilation duct is disposed above the cooling duct, especially preferably in a refractory insulation layer above the cooling duct.

In a further preferred embodiment of the invention, the flue gas ventilation duct is anchored in the reformer base.

The flue gas ventilation duct is preferably connected to a flue gas conveying device (either by pressure or suction).

The cooling duct is preferably connected to a combustion air conveying device. The expression "combustion air conveying device" in the context of the invention encompasses devices (e.g. fans) that either exert pressure or suction to convey cooling medium. This configuration allows the air (combustion air) required for combustion in the reformer burners to be preheated in an energetically advantageous manner.

The cooling duct is preferably connected to an air intake opening outside the reformer chamber, such that the cooling duct can be flooded with external air as cooling medium.

The air intake opening and/or a second air intake opening (with an air intake opening in/within the underbody chamber) is preferably connected via the cooling duct to a first auxiliary conveying device.

In a further configuration, a second auxiliary conveying device is connected to the cooling duct via the air intake opening, preferably for the purpose of reinforcing the suction effect of the combustion air conveying device.

In a further configuration, the cooling duct is connected via/to the second auxiliary conveying device that forces the cooling medium into the cooling ducts.

The first auxiliary conveying device and/or the second auxiliary conveying device may be disposed outside the reformer space and upstream of the cooling duct in cooling direction (flow direction of the cooling medium) so as to impart pressure and/or downstream of the reformer firing space in cooling direction so as to impart suction.

Preferably, the combustion air conveying device is connected to the reformer burner via a first heat exchanger within the flue gas ventilation duct. The incorporation of the first heat exchanger permits utilization of the waste heat from the flue gas ventilation duct for the preheating of the burner air.

In a further preferred embodiment of the invention, the heat exchanger is disposed in the flue gas ventilation duct or a collecting space for multiple ventilation ducts.

A second heat exchanger is preferably disposed upstream and/or downstream of the combustion air conveying device or optionally of the first auxiliary conveying device in process direction (flow direction of the process streams or of the cooling media).

In a preferred embodiment, the cooling duct is connected to a second air intake opening within/on the underbody chamber. The expression "within/on" in the context of the invention preferably encompasses positioning of the second air intake opening within the underbody chamber, or positioning of the second air intake opening on or on an outer wall. More preferably, the cooling duct is connected to the second air intake opening via/by the first auxiliary conveying device. Air intake from the underbody chamber further reduces the temperature in the lower region of the reformer and the thermal stress on the reformer base.

Alternatively, it is possible to inject ambient air into the twin base via a second auxiliary conveying device.

The invention further encompasses a plant for preparation of ammonia, ammonia and urea, hydrogen and methanol, and plants for dehydrogenation of propane and butane, comprising a reformer as described above.

In a further configuration, the invention encompasses the use of a reformer as described above for production of a gas mixture at least comprising hydrogen and carbon monoxide.

The invention further encompasses a process for preparing synthesis gas, at least comprising the steps that follow. In a first step, a hydrocarbon mixture (preferably methane/natural gas) and steam is introduced into a reformer at a temperature of 400° C. to 700° C. and a pressure of 10 bar to 50 bar. The reformer comprises at least one reformer firing space having a reformer base, reformer walls and a reformer roof. At least sections of a first reformer tube and a second reformer tube are disposed in the reformer firing space. The expression "at least sections of" in the context of the invention means that at least some of the first reformer tube and at least some of the second reformer tube run within the reformer firing space. In general, only a subsection of the first reformer tube and of the second reformer tube passes through the combustion chamber, meaning that the first reformer tube and the and a second reformer tube are conducted into the combustion chamber and then conducted out of the combustion chamber. The expression "first reformer tube and second reformer tube" in the context of the invention describe the requisite minimum configuration; in general, further reformer tubes, for example 30 to 1800, are disposed in the reformer firing space. Additionally present is at least one reformer burner disposed within the reformer firing space. In general, multiple reformer burners are disposed in the firing space, for example 15 to 600 reformer burners. A flue gas ventilation duct is disposed between the first reformer tube and the second reformer tube, and, optionally, the first reformer tube and the second reformer tube are connected to a collecting system outside the reformer chamber and the collecting system is disposed in an underbody chamber beneath the reformer chamber. The reformer of the invention for preparation of synthesis gas is characterized in that a cooling duct is disposed on or beneath the reformer base between the first reformer tube and the second reformer tube. The expression "cooling duct" in the context of the invention encompasses tubes, passages, ducts disposed on or beneath the reform base that are suitable for conducting a suitable liquid or gaseous cooling medium through the reformer base. The cooling ducts are designed such that the cooling medium can absorb thermal energy from the reformer base, meaning that the cooling medium can heat up. The walls of the cooling ducts may comprise, non-conclusively: masonry elements (for example bricks), metal plates or ceramic wall elements. The conduction of a cooling medium, for example air, enables a distinct reduction in the temperature of the reformer base and hence unexpected distinct increase in the lifetime of the reformer base. The first reformer tube and the second reformer tube are filled with a suitable catalyst or catalyst bed, for example nickel and/or compounds and/or mixtures thereof. After the hydrocarbon mixture (preferably methane/natural gas, LPG, naphtha, refinery offgases) and steam have been passed through the first reformer tube and the second reformer tube, a mixture at least comprising hydrogen and carbon monoxide, i.e. synthesis gas mixture, is obtained. The process of the invention is characterized in that a cooling medium, preferably air, is guided through the cooling ducts. Useful cooling media alongside gases are also liquid media, for example water, aqueous solutions, organic solutions, oils or silicone oils. The guiding of the cooling medium distinctly reduces the temperature of the base plate. This temperature lowering crucially reduces material fatigue of the base plate and enables a less thick design of the insulation layer on the base plate, and hence also the weight acting on the base plate.

In a preferred embodiment of the process of the invention, the cooling medium has an inlet temperature of −20° C. to 100° C.

The cooling duct is preferably flooded with external air or air from the underbody chamber. Flooding with external air is the simplest implementation of supply with cooling medium. Air intake from the space which is frequently beneath the reformer base, also called "underbody space", further reduces the temperature in the lower region of the reformer.

In a preferred configuration, the cooling duct is operated with a conveying device in suction operation. The conveying device is connected here to the reformer burner for the provision of combustion air. The connection mentioned enables preheating of the air for the reformer burner via the thermal energy absorbed by the cooling medium from the reformer base.

The invention is elucidated in detail hereinafter by an example. The example does not restrict the invention to any degree.

Example (Comparison of Expected Temperatures)

In a simulation calculation, the expected temperatures on the reformer base were compared with a cooling duct on the base (example) and without a cooling duct on the base (comparative example). The rest of the construction of a primary reformer (dimensions, number of reformer tubes) is identical in both examples.

TABLE 1

Estimate of reformer base temperatures

| Base design | Comparative example | Example (inventive) |
|---|---|---|
| Temperature in the design case | 100° C. | 65° C. |
| Maximum temperature under poor cooling conditions (summer, daytime, no wind, middle of reformer) | 150° C. | 80° C. |
| Minimum temperature under the best cooling conditions (winter, nighttime, wind, edge of reformer) | 60° C. | 50° C. |

The temperatures estimated in table 1 show a distinct lowering of the temperature in the inventive example. This distinctly reduces material stress and material fatigue on the reformer base. It is more preferably possible to reduce the temperature variations by means of control devices with which the flow of cooling medium can be favorably adjusted.

The invention is additionally elucidated in detail by the figures that follow. The figures do not restrict the scope of protection of the invention, but serve for illustrative elucidation. The figures are not true to scale.

Figure 1:
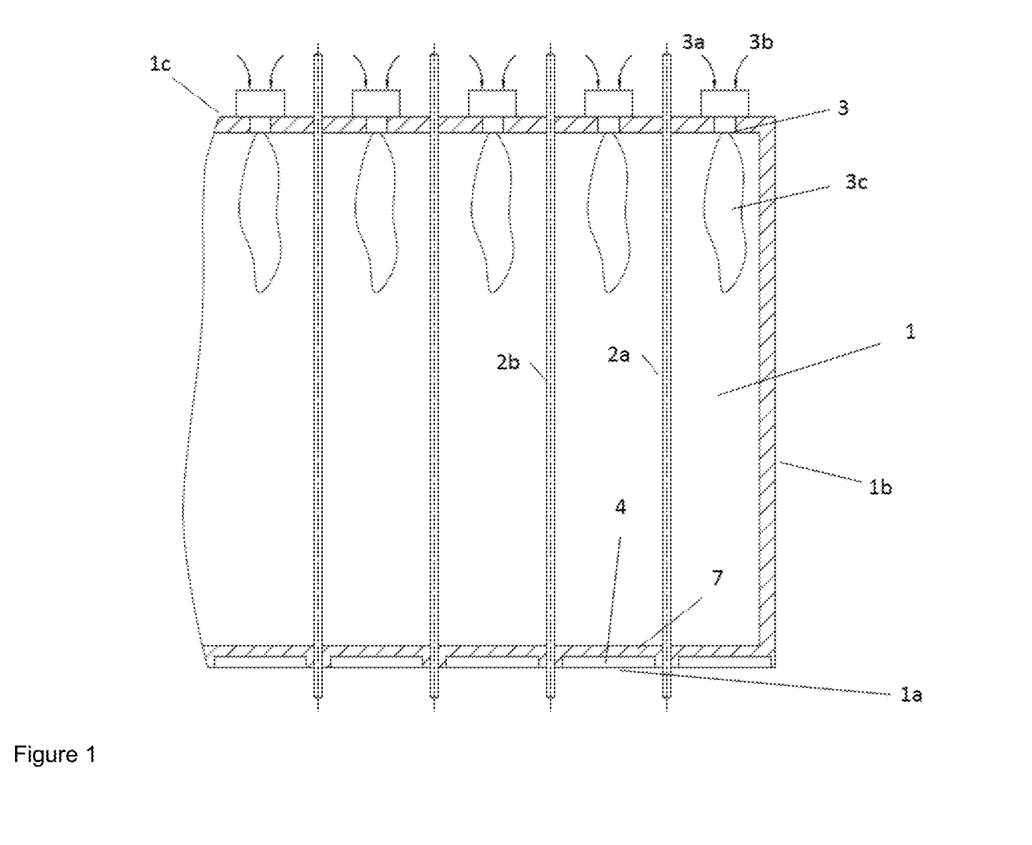
FIG. 1 is a cross-sectional view of an example reformer.

FIG. 1 shows a cross section of the reformer of the invention. The reformer firing space (1) comprises a reformer base (1a), reformer walls (1b) and a reformer roof (1c). Disposed atop the reformer base (1a) is an insulation layer (7). At least sections of a first reformer tube (2a) and a second reformer tube (2b) are disposed in the reformer firing space (1). Moreover, further reformer tubes that are not marked explicitly are disposed in the reformer firing space (1). The reformer tubes (2a/2b) are filled with a catalyst or catalyst bed, preferably nickel and/or compounds and/or mixtures thereof. Additionally present is at least one reformer burner (3) disposed within the reformer firing space. In general, multiple reformer burners (3) are disposed in the reformer firing space (1). The reformer burner (3) is supplied with combustion gas (3a) and combustion air (3b). The combustion gas (3a) and the combustion air (3b) may be provided via different conduits or one conduit (not shown). The expression "within" in the context of the invention describes/encompasses reformer burners that can act into the reformer firing space. The reformer of the invention comprises a cooling duct (4) on the reformer base (1a) between the first reformer tube (2a) and the second reformer tube (2b). The passage of a cooling medium, for example air, enables a distinct reduction in the temperature of the reformer base (1a) and hence an expected distinct increase in the lifetime of the reformer base (1a).

Figure 2:
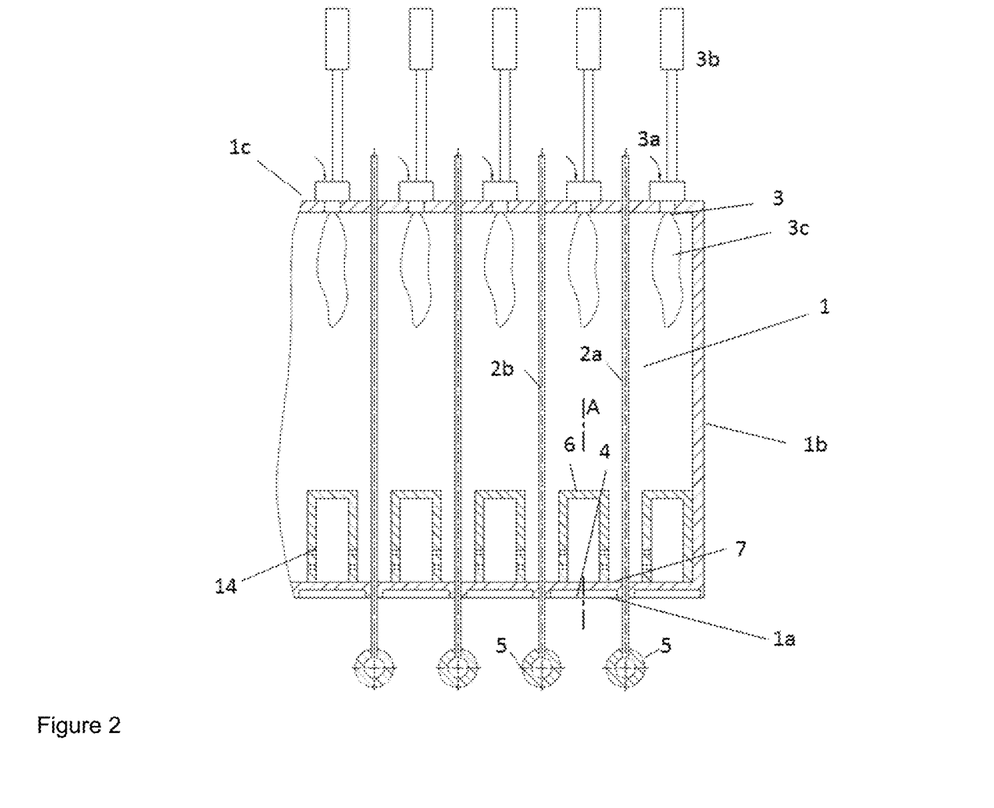
FIG. 2 is another cross-sectional view of an example reformer.

FIG. 2 shows a cross section of a preferred embodiment of the reformer of the invention. The basic construction corresponds to that described for FIG. 1. A flue gas ventilation duct (6) is disposed between the first reformer tube (2a) and the second reformer tube (2b). The first reformer tube (2a) and the second reformer tube (2b) merge into a collecting system (5). The flue gas ventilation duct (6) is preferably designed in the form of a brickbuilt duct, with the flue gas ventilation duct (6) having flue gas inlet openings (14) for admittance of the flue gas from the reformer firing space. The flue gas ventilation duct (6) is preferably disposed above the cooling duct (4), especially preferably atop the refractory insulation layer (7) above the cooling duct (4).

Figure 3:
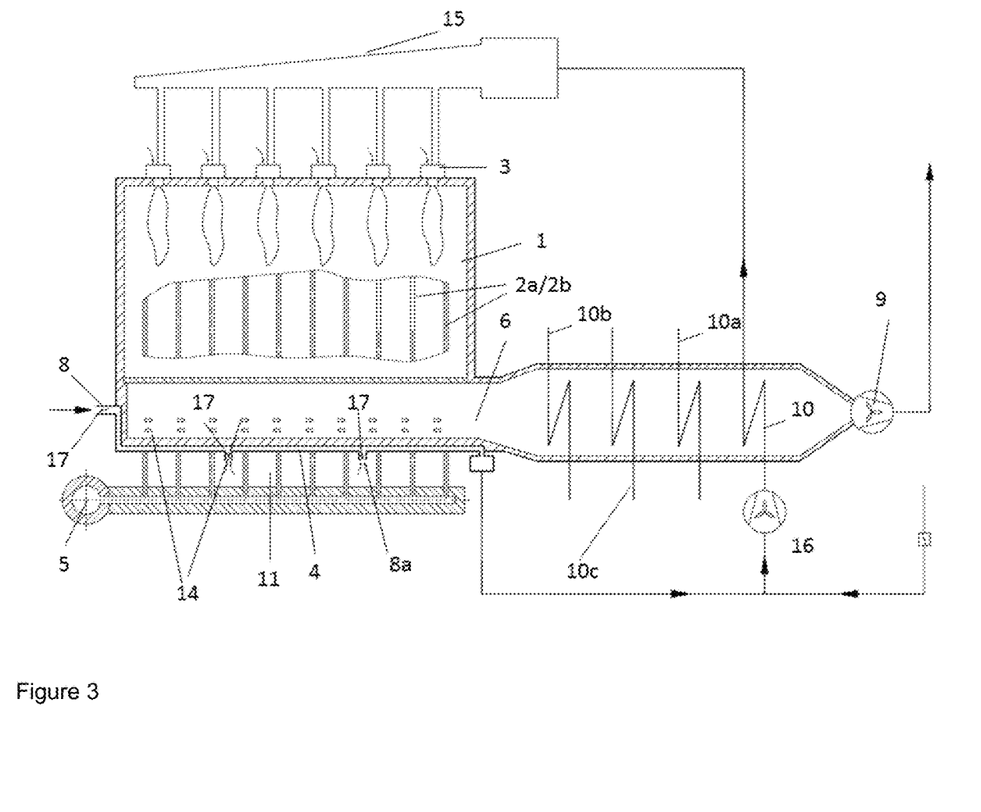
FIG. 3 is a schematic view along a section axis A from FIG. 2.

FIG. 3 shows a schematic view along the section axis A from FIG. 2. The basic construction of the reformer firing space (1) corresponds to that described in FIG. 2. The waste air from the flue gas ventilation duct (6) serves to heat exchangers (10/10a/10b/10c) and to preheat the air for the reformer burners (3) that are connected via a collecting system (15). A conveying system (9) enables the removal of the flue gases from the flue gas ventilation duct (6). In the design shown, air is introduced through the cooling duct (4) via the intake openings (8) and (8a). The combustion air conveying device (16) creates the reduced pressure required in the cooling duct for intake of the air. Warm air is sucked in from the underbody chamber (11) by the second air intake opening (8a). It is thus possible to effectively lower the temperature within the underbody chamber (11) and to reduce the thermal stress on the reformer base (1a). The flow of the cooling medium can be controlled further via control valves (17).

Figure 4:
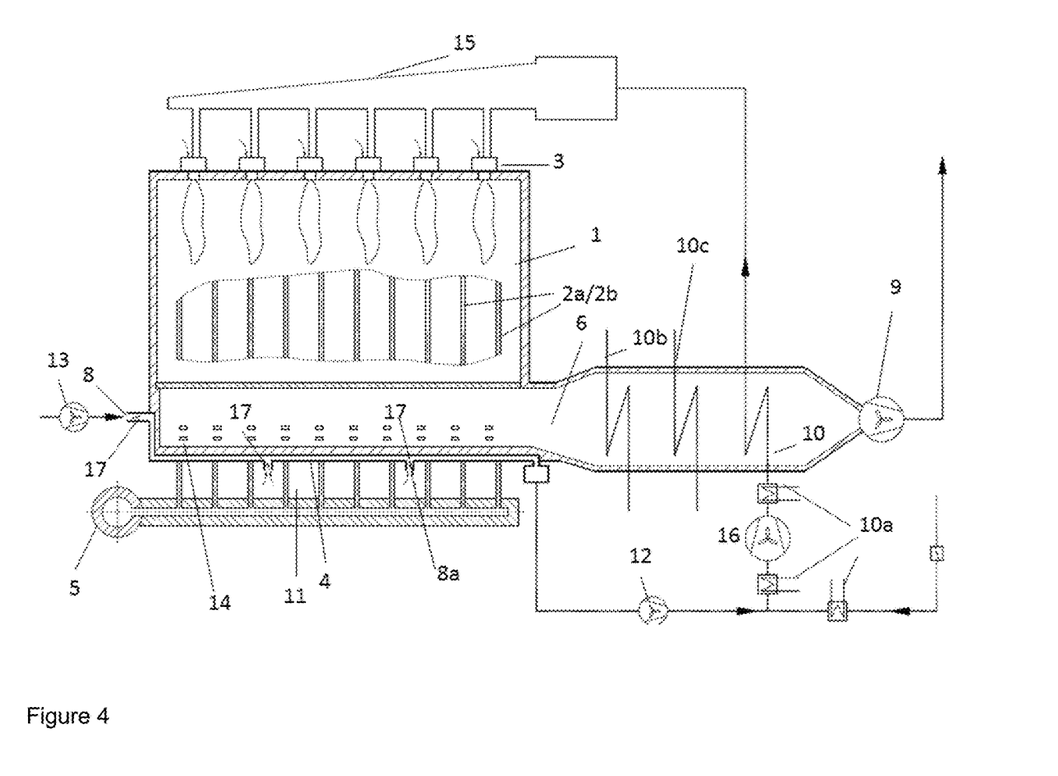
FIG. 4 is another schematic view along the section axis A from FIG. 2.

FIG. 4 shows a further schematic view along the section axis A from FIG. 2. The fundamental construction corresponds to that described for FIG. 3. For improvement of energy exploitation, further heat exchangers (10a) are provided. The heating of the combustion air in the cooling ducts (4) allows the heat exchangers to have a small design or to be dispensed with completely. An additional first auxiliary conveying device (12) and second auxiliary conveying device (13) can be used to further improve the flows of the cooling medium in the cooling duct (4).

LIST OF REFERENCE NUMERALS (1) reformer firing space
(1a) reformer base
(1b) reformer walls
(1c) reformer roof
(2a) first reformer tube
(2b) second reformer tube
(3) reformer burner
(4) cooling duct
(5) collecting system
(6) flue gas ventilation duct
(7) refractory insulation layer
(8) air intake opening
(8a) second air intake opening
(9) flue gas conveying device
(10) first heat exchanger
(10a) second heat exchanger
(10b) third heat exchanger
(10c) fourth heat exchanger
(11) underbody chamber
(12) first auxiliary conveying device
(13) second auxiliary conveying device (14) flue gas inlet openings
(15) burner collecting system
(16) combustion air conveying device
(17) control valves

What is claimed is:

1. A reformer for at least one of producing synthesis gas or hydrogen or dehydrogenating propane or butane, the reformer comprising:
   a reformer firing space having a reformer base, reformer walls, and a reformer roof,
   a first reformer tube and a second reformer tube, wherein sections of the first reformer tube and the second reformer tube are disposed within the reformer firing space;
   a reformer burner disposed within the reformer firing space; and
   a cooling duct configured to cool the reformer base to a range between 80° C. and 50° C. on or beneath the reformer base, with the cooling duct being disposed between the first reformer tube and the second reformer tube, wherein the cooling duct is connected to a combustion air conveying device configured as a fan, wherein the cooling duct is spaced apart from the reformer firing space.

2. The reformer of claim 1 wherein the first reformer tube and the second reformer tube are connected to a collecting system outside the reformer firing space, with the collecting system being disposed beneath the reformer base.

3. The reformer of claim 2 wherein the collecting system is disposed in an underbody chamber beneath the reformer firing space.

4. The reformer of claim 1 wherein the reformer base comprises metallic, mineral, or ceramic materials.

5. The reformer of claim 1 comprising a refractory insulation layer is disposed on the reformer base and the cooling duct.

6. The reformer of claim 1 wherein the cooling duct is a first cooling duct, the reformer comprising a second cooling duct disposed on at least one of the reformer roof or the reformer walls.

7. The reformer of claim 1 comprising a flue gas ventilation duct disposed between the first reformer tube and the second reformer tube.

8. The reformer of claim 7 wherein the flue gas ventilation duct is anchored in the reformer base.

9. The reformer of claim 7 wherein the flue gas ventilation duct is connected to a flue gas conveying device.

10. The reformer of claim 1 wherein the cooling duct is connected to an air intake opening outside the reformer firing space.

11. The reformer of claim 10 wherein the air intake opening is a first air intake opening, wherein at least one of the first air intake opening or a second air intake opening in or within an underbody chamber beneath the reformer firing space is connected to a first auxiliary conveying device via the cooling duct.

12. The reformer of claim 11 comprising a second auxiliary conveying device connected via the air intake opening to the cooling duct.

13. The reformer of claim 10 wherein the combustion air conveying device is connected to the reformer burner via a first heat exchanger within a flue gas ventilation duct.

14. The reformer of claim 13 comprising a second heat exchanger disposed upstream or downstream of the combustion air conveying device in a process direction.

15. The reformer of claim 1 configured to produce a gas mixture comprising hydrogen and carbon monoxide.

16. A plant for preparing ammonia, ammonia and urea, hydrogen and methanol, and for dehydrogenation of propane and butane, the plant comprising the reformer of claim 1.

17. A process for producing synthesis gas, the process comprising:
   introducing a hydrocarbon mixture and steam at a temperature of 400° C. to 700° C. and a pressure of 10 bar to 50 bar into a reformer, wherein the reformer comprises:
      a reformer chamber having a reformer base,
      a first reformer tube and a second reformer tube, wherein sections of the first reformer tube and the second reformer tube are disposed in the reformer chamber,
      a reformer burner disposed within the reformer chamber,
      a flue gas ventilation duct between the first reformer tube and the second reformer tube, and
      a cooling duct configured to cool the reformer base to a range between 80° C. and 50° C. disposed on the reformer base between the first reformer tube and the second reformer tube;
   guiding a cooling medium through the cooling duct, with the cooling medium having an inlet temperature of −20° C. to 100° C.; and
   obtaining a mixture comprising hydrogen and carbon monoxide.

18. The process of claim 17 comprising flooding the cooling duct with external air or air from an underbody chamber.

19. The process of claim 17 comprising operating the cooling duct with a combustion air conveying device, wherein the combustion air conveying device is connected to the reformer burner for providing combustion air.

* * * * *